(No Model.)  2 Sheets—Sheet 1.
R. MORHARD.
DOUGH ROLLING MACHINE.
No. 319,991. Patented June 16, 1885.
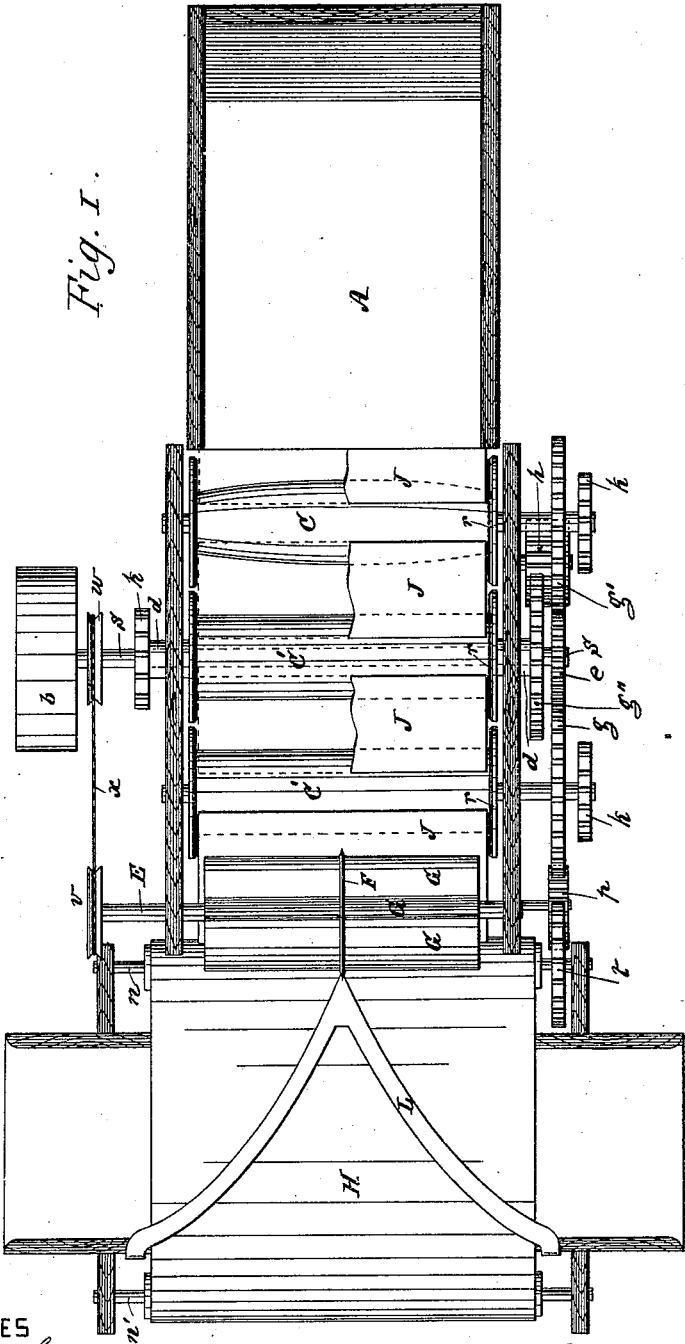
Fig. I.
WITNESSES
Wm A Lowe
Robt Roy
INVENTOR
Roman Morhard
per Roeder & Briesen
Attorneys.

(No Model.) 2 Sheets—Sheet 2.
R. MORHARD.
DOUGH ROLLING MACHINE.
No. 319,991. Patented June 16, 1885.
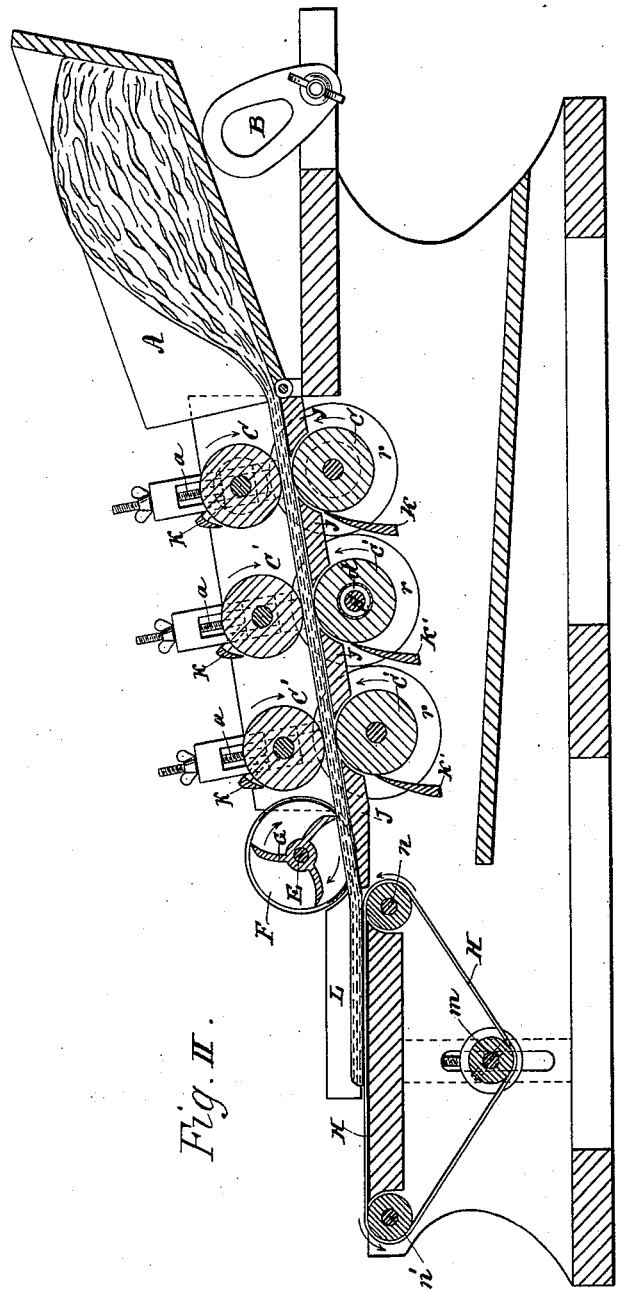
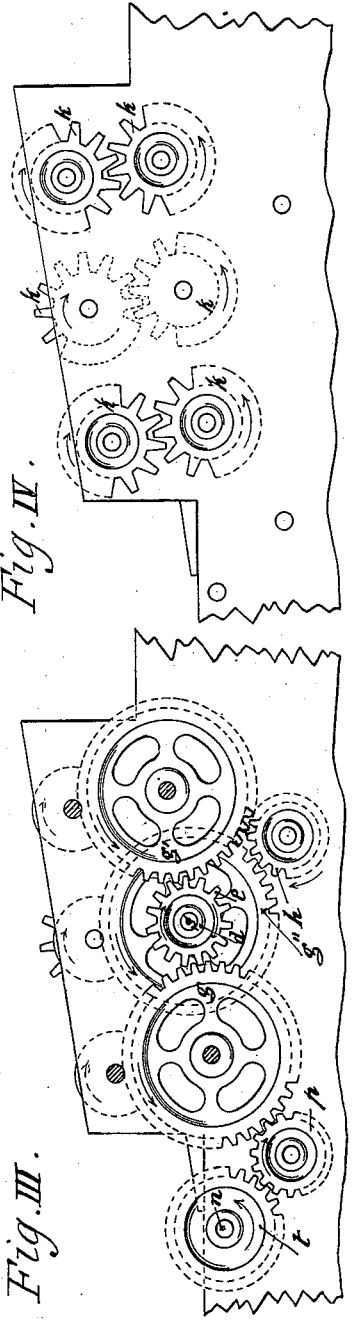
WITNESSES
Wm A. Lowe
Robt Roy.
INVENTOR
Roman Morhard
per Roeder & Bristow
attorneys.
N. PETERS, Photo-Lithographer, Washington, D. C.

UNITED STATES PATENT OFFICE.

ROMAN MORHARD, OF BROOKLYN, NEW YORK.

DOUGH-ROLLING MACHINE.

SPECIFICATION forming part of Letters Patent No. 319,991, dated June 16, 1885.

Application filed March 5, 1885. (No model.)

*To all whom it may concern:*

Be it known that I, ROMAN MORHARD, a citizen of the United States, and a resident of Brooklyn, in the State of New York, have invented new and useful Improvements in Dough-Rolling Machines, of which the following is a specification.

In the accompanying drawings, Figure I shows a top view of the machine. Fig. II is a longitudinal section of the same. Fig. III is a side view of part of the machine, showing the driving-gear; and Fig. IV shows a side view of the gearing connecting the lower rollers with the upper rollers.

Similar letters represent similar parts in all the figures.

A is the dough-trough, hinged at its forward end to the frame of the machine, and acted upon near its after end by a suitable cam, B, operated by hand, to regulate the position and inclination of this trough, so as to discharge the required quantity of previously prepared and mixed dough.

Before the trough A three or more sets of rollers, C C' C', are arranged. The lower rollers of each set are provided with large flanges $r$, between which the upper rollers fit, to prevent the escape of the dough. The rollers C' are all straight and parallel to each other, while the first set of rollers, C, is larger in diameter in the center than at the ends. By this arrangement the dough is pressed out toward the ends of the rolls, and insures an even thickness of the dough when delivered by the last set of rolls C' for the whole width of the same. The lower rolls of each set are supported in stationary bearings in the frame of the machine, while the upper rolls of each set are supported in movable bearings in said frames, operated by screws $a$, for the purpose of regulating the distance between the rollers according to the thickness the dough requires to be rolled.

Forward of the last set of rolls C' a shaft, E, is arranged in suitable bearings in the main frame of the machine, provided with a central circular cutter, F, and a number of horizontal cutters, G; or two or more circular cutters may be arranged on said shaft, between which the horizontal cutters are placed according to the size the dough is to be cut. By this arrangement the dough, when delivered by the last set of rolls, is cut into two or more pieces by the circular cutters F, and then into the required smaller pieces by these horizontal cutters G. Close to these cutters and extending forward an endless apron, H, is arranged, running over fixed rollers $n$ $n'$, and a tightening-roller, $m$, operated by a suitable screw to keep this apron always stretched tight. The fixed rolls $n$ $n'$ are made straight, while the tightening-roller $m$ is made smaller in diameter in its central part than it is at its outer edges, for the purpose of keeping the upper surface of said apron perfectly straight and smooth.

Between the trough A and the first set of rollers, C, as well as between each set of rollers and between the last roller and the apron H, the usual guiding-plates, J, are arranged to conduct the dough from one part to the other in nearly a straight surface. To facilitate the easy motion of the dough, the whole arrangement, except the apron, is placed slightly in an incline.

Above the apron H, but sufficiently distant from the same to allow the free motion of the apron, a tapering guide, L, is arranged, supported by the frame of the machine. According to the shape of this guide the cut-off pieces of dough can be delivered at both sides of the machine, as shown in the drawings, Fig. I; or the same can be arranged so as to discharge the same at one or the other side, as may be desired.

The necessary motion of the several parts is obtained by the following mechanism: Upon the driving-shaft $s$ the driving-pulley $b$ is placed. This shaft $s$ passes through the hollow axle or sleeve $d$ of the central lower roller C', and carries at its end a pinion, $e$, meshing into wheels $g$ $g'$ fast to the axles of the lower roller C, and outer roller, C', thereby giving the required motion to said rollers. The wheel $g'$ meshes into a pinion, $h$, turning on a fixed center, and which said pinion $h$ works, likewise, into a wheel, $g''$, fast upon the sleeve or hollow axle $d$ of the central lower roller C'.

The lower rollers are connected with their respective upper roller through wheels $k$ $k$, (see Fig. IV,) made with very deep teeth, to accommodate the varying distances between the upper and lower rolls. The wheel $g$ works into a pinion, p, turning on a fixed center, and said pinion p gears into the wheel t, attached to the shaft, which carries the roller n, and thus gives the desired motion to the apron H.

The shaft E, to which the cutters are attached, is provided with a suitable pulley, v, connected by a belt, x, with a corresponding pulley, w, attached to the driving-shaft s. (See Fig. I.)

What I claim as my invention, and desire to secure by Letters Patent, is—

1. The combination of trough A, adapted to receive the dough, with a train of rollers, C C', intermediate tapering guide, L, and apron H, substantially as described.

2. The combination of trough A with rollers C, tapering from the center toward the ends, and with cylindrical rollers C' C', as and for the purpose described.

3. The combination of trough A with rollers C C', cutters F G, and tapering guides L, substantially as described.

4. The combination of trough A with cam B, rollers C C', guide-plates J, cutters F G, apron H, and tapering guide L, arranged to operate in the manner and for the purpose substantially as described.

ROMAN MORHARD.

Witnesses:
HENRY E. ROEDER,
M. E. McHUGH.